United States Patent [19]

Lastrina et al.

[11] Patent Number: 4,527,387
[45] Date of Patent: Jul. 9, 1985

[54] PARTICLE SEPARATOR SCROLL VANES

[75] Inventors: Frank A. Lastrina, Andover; Leslie M. Pommer, Danvers, both of Mass.; Jeffrey C. Mayer, Seymour, Conn.

[73] Assignee: General Electric Company, Lynn, Mass.

[21] Appl. No.: 444,570

[22] Filed: Nov. 26, 1982

[51] Int. Cl.³ .............................................. F02G 3/00
[52] U.S. Cl. .................................. 60/39.092; 55/306; 244/53 B; 415/121 G
[58] Field of Search ....................... 60/39.092; 55/306; 244/53 B, 121; 415/9, 121 G

[56] References Cited

U.S. PATENT DOCUMENTS

| | | | |
|---|---|---|---|
| 2,802,618 | 8/1957 | Prachar | 415/121 G X |
| 3,309,867 | 3/1967 | Ehrich . | |
| 3,338,049 | 8/1967 | Fernberger . | |
| 3,362,155 | 1/1968 | Driscoll . | |
| 3,832,086 | 8/1974 | Hull, Jr. . | |
| 3,970,439 | 7/1976 | Murphy | 60/39.092 X |
| 3,978,656 | 9/1976 | Murphy | 60/39.092 |
| 3,979,903 | 9/1976 | Hull, Jr. et al. | 60/39.092 |
| 4,265,646 | 5/1981 | Weinstein et al. . | |
| 4,268,284 | 5/1981 | Kent et al. | 60/39.092 X |

FOREIGN PATENT DOCUMENTS 1070458 6/1967 United Kingdom .
1195973 6/1970 United Kingdom .
1516466 7/1978 United Kingdom .
1544202 4/1979 United Kingdom .

OTHER PUBLICATIONS

General Electric, "Integral Engine Inlet Particle Separator", Aug. 1975, p. 17, USAAMRDL-TE-75-31B.
ASME P82-GT-40, "Small Engine Inlet Air Particle Separator Technology", by H. L. Morrow and D. B. Cale.

Primary Examiner—Louis J. Casaregola
Assistant Examiner—Donald E. Stout
Attorney, Agent, or Firm—Francis L. Conte; Derek P. Lawrence

[57] ABSTRACT

An inlet particle separator for a gas turbine engine is provided with unique vanes distributed around an entrance to a particle collection chamber. The vanes are uniquely constructed to direct extraneous particles that enter the engine into the collection chamber and prevent the particles from rebounding back into the engine's air flow stream. The vanes are provided with several features to accomplish this function, including upstream faces that are sharply angled towards air flow stream direction to cause particles to bounce towards the collection chamber. In addition, throat regions between the vanes cause a localized air flow acceleration and a focusing of the particles that aid in directing the particles in a proper direction.

13 Claims, 4 Drawing Figures

U.S. Patent  Jul. 9, 1985  Sheet 1 of 2  4,527,387
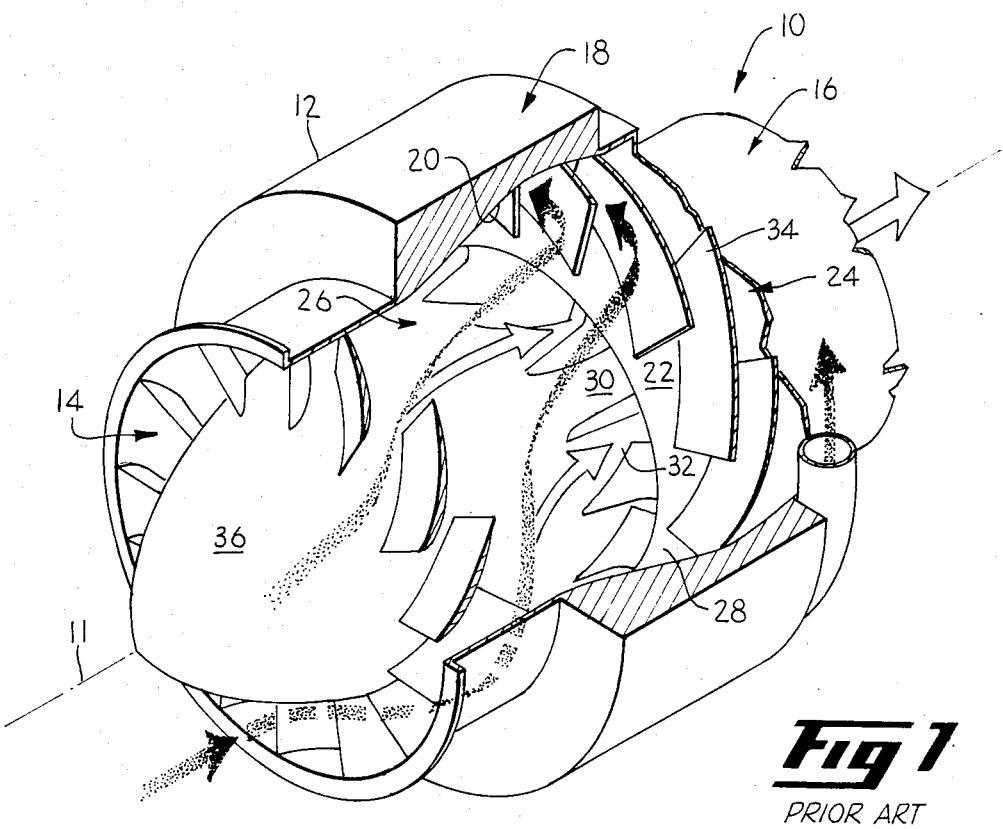
Fig 1
PRIOR ART
Fig 2
PRIOR ART
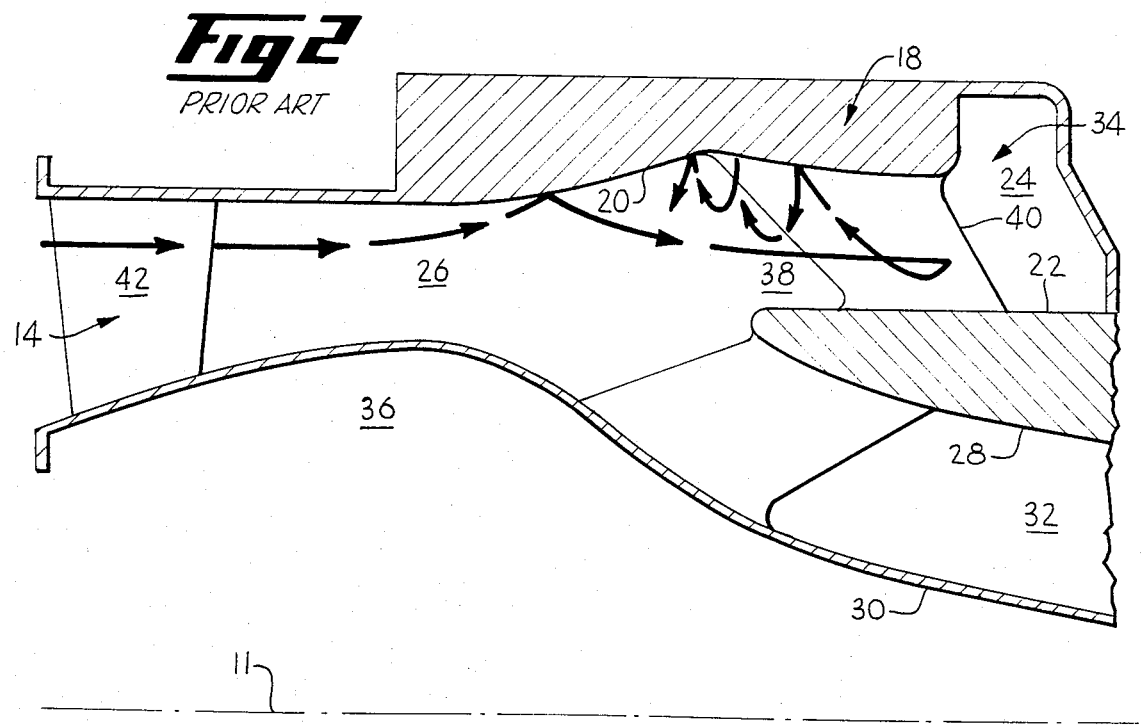

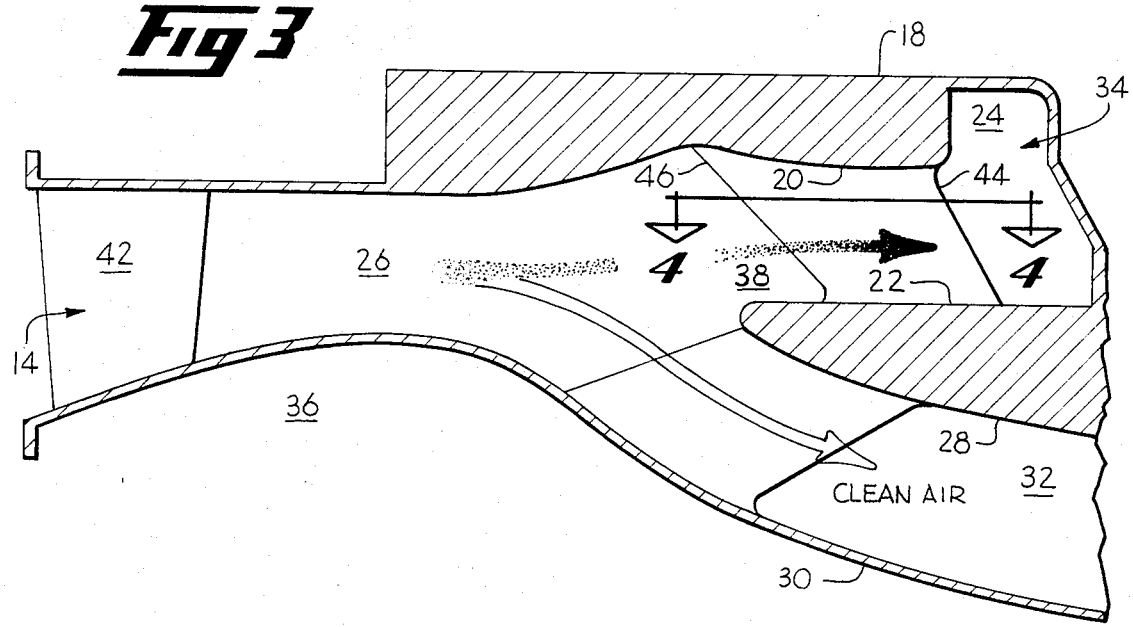
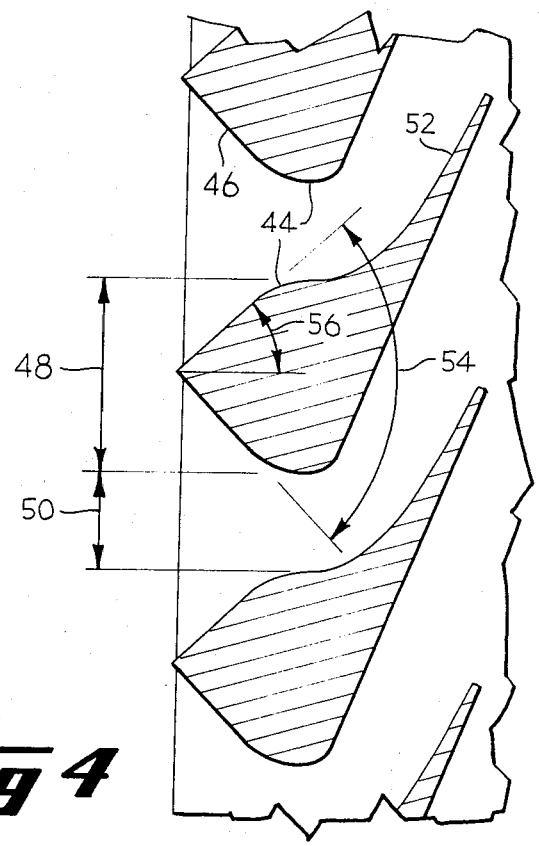

PARTICLE SEPARATOR SCROLL VANES

BACKGROUND OF THE INVENTION

1. Field of the Invention

This invention relates to devices known as particle separators that remove sand and extraneous matter from air entering gas turbine engines and more particularly to an improved vane within a collection chamber of a particle separator for such an engine.

2. Background of the Prior Art

Aircraft gas turbine engines are particularly susceptible to damage from foreign objects introduced into air inlets of the engines. The problem has been most acute in the past with respect to relatively large foreign objects such as stones, gravel, birds and hail.

With the advent of gas turbine powered helicopters and other verticle takeoff and landing (VTOL) aircraft, smaller particles of foreign matter such as sand and water have become increasingly troublesome due primarily to the conditions under which such VTOL aircraft are frequently operated. The advantage of VTOL capability makes such aircraft particularly useful in areas where conventional air fields do not exist, frequently occurring in combat zones and other isolated areas. VTOL aircraft are also specially suited for certain low-altitude missions over both land and sea. Under these and other similar conditions, substantial quantities of small foreign objects such as sand and water may become entrained in intake air supplied to the gas turbine engine. These foreign particles, which individually have relatively little effect on the engine, can cause very substantial damage when ingested into the engine in large quantities.

As an example, recent experience has shown that engines in helicopters operating at low altitude in a desert environment can lose performance very rapidly due to erosion of the engine blading by the ingestion of dust and sand particles. Similar problems can occur when operating over salt water because of heavy ingestion of salt-water droplets which can cause both corrosion and destructive erosion of turbine structures.

In attempting to solve this problem, various particle separator systems have been developed for use with gas turbine engines. One example of a successful system is disclosed in U.S. Pat. No. 3,832,086—Hull, Jr., et al. In this disclosure, a separator system is shown with a collection chamber into which extraneous matter is directed with centrifugal forces. While the advantages of such a system are numerous, it has been found that particles entering the collection chamber will sometimes strike certain flat surfaces and be caused to bounce back into the flow stream of air entering the engine's core. Regurgitation of extraneous matter in this fashion can work to reduce the efficiency of the particle separator system.

It is, therefore, an object of the present invention to provide an improved engine inlet particle separator wherein separation efficiency is increased by reducing the volume of particles which are rebounded back into a core engine inlet after first entering a separate collection chamber area.

It is another object of the present invention to provide collector flowpath vanes that operate to scavenge and retain extraneous matter entering a collection chamber of the separator and prevent such extraneous matter from regurgitating back into the core engine flow stream.

SUMMARY OF THE INVENTION

A gas turbine engine is provided with an improved engine inlet particle separator for removing extraneous matter from a stream of air directed into the engine's core. The separator utilizes a collection chamber that receives and traps with a centrifugal action the extraneous matter from the incoming air before that air enters a core stream flowpath. To receive and trap such extraneous matter, the collection chamber is provided with an annular entrance within which collector flowpath vanes are distributed circumferentially. These flowpath vanes have upstream faces that are sufficiently angled towards air flow direction to generally prevent extraneous matter from bouncing off the upstream faces in an upstream direction and being regurgitated back into the core engine flowpath. It has been found that upstream faces should generally be angled to within 52 degrees of engine axial direction to generally prevent such regurgitation.

The vanes also cooperate physically with each other to form throat regions between opposing surfaces of the vanes for receiving and trapping extraneous matter in the collection chamber. The vane throat regions also cause incoming air to be accelerated, thereby drawing extraneous matter into and through the throat regions and thereby creating a natural blockage to regurgitation of extraneous matter because of local flow stream acceleration. This acceleration also provides an advantage of minimizing separation of air flow stream into the collection chamber.

DESCRIPTION OF THE DRAWINGS

While the specification concludes with claims distinctly claiming and particularly pointing out the invention described herein, it is believed that the invention can be more readily understood by reference to the following discussion and accompanying drawings in which:

FIG. 1 depicts a partially cutaway, perspective view of an inlet to a gas turbine engine equipped with a particle separator.

FIG. 2 depicts a cross-sectional view of a portion of an inlet to a gas turbine engine equipped with a particle separator.

FIG. 3 depicts a cross-sectional view of an inlet to a gas turbine engine equipped with a particle separator employing one embodiment of the present invention.

FIG. 4 depicts a cross-sectional view of scroll vanes taken along IV—IV of FIG. 3.

DESCRIPTION OF THE PREFERRED EMBODIMENT

Referring now to FIG. 1, a schematic representation is shown of a gas turbine engine assembly 10 with portions of the engine cut away in order to show certain components of the engine's internal structure. Being a gas turbine engine, the engine 10 extends axially along an engine center line or axis 11, indicated along X—X and includes a casing 12 open at its forward end to provide an engine intake 14 for accepting air flowing in a direction that is generally parallel to the engine axis. The outside air passes sequentially through specific sections of the engine that utilize the air in combination with fuel to create high-energy combustion gases that are harnessed to provide engine power.

To summarize this process, the air that is utilized to support the combustion processes is directed through increasingly narrower passages and simultaneously compressed with rapidly rotating compressor blades before it is combined with fuel in a combustor (not shown) and ignited. After combustion is initiated, the resulting high-energy gas flow stream is directed through a multitude of rapidly rotating turbine blades at extremely high velocities and pressures, in order to produce power within the engine. The high temperatures and pressures create a harsh environment in the gas turbine engine. Any air utilized in this environment must be relatively free of extraneous matter or it will cause harmful effects upon the engine's internal stucture.

In order to remove extraneous matter from air entering the engine's core, shown generally at 16, a particle separator 18 is provided downstream of the intake 14 for the purpose of removing this extraneous matter from intake air. The separator 18 has outer wall means 20 and inner wall means 22 forming therebetween a collection chamber 24. The purpose of the chamber 24 is to collect extraneous matter after it is extracted from engine intake air. After entering the intake 14, the intake air is directed into an annular intake passageway 26 where separation of extraneous matter is initiated. Downstream of the annular intake passageway 26 a pair of spaced-apart wall members 28 and 30 define an annular core engine inlet 32. From the core engine inlet 32 the air enters a compressor section (not shown) and, thereafter, other engine sections where the air is utilized to provide engine power.

Before entering the core engine inlet 32, the intake air must be cleaned and generally free of extraneous matter. The collection chamber 24, located radially outwardly of the core engine inlet 32, is that area provided for receiving the extraneous matter and collecting it in such a manner that the sand, dirt and dust is retained within the particle separator 18 and is not allowed to be reingested into the annular intake passageway 26 or into the core engine inlet 32. In order to prevent such reingestion, some type of scavenging means 34 must be provided in the inlet particle separator 18. The function of the scavenging means is to retain such extraneous matter and prevent reingestion.

Referring now to FIG. 2, a cross-sectional view of a particle separator 18 and nearby components of an engine are shown for the purpose of better describing the manner in which extraneous matter is separated. An upper and forward portion of the engine is shown only. The engine's center line 11 is indicated along the line drawn at the bottom of FIG. 2. As stated earlier in the description of FIG. 1, outside air enters the engine intake 14 and is directed into an annular intake passageway 26. The air entering the annular intake passageway 26 is accelerated because of pressure forces caused by the engine's compressor section (not shown) located downstream of the passageway 26. Any extraneous matter that is entrained in the outside air is also accelerated and is induced to move rapidly in a direction roughly parallel to the engine center line. This direction is generally described as axial by those skilled in the art.

An engine hub 36 defines a radially inward boundary of the annular intake passageway 26, and it can be readily appreciated by the reader that this engine hub 36 has a maximum diameter in respect to engine center line as shown in FIG. 2. From its region of maximum diameter, the engine hub 36 rapidly decreases in diameter and thereafter forms an inner boundary of the core engine inlet 32, which is defined by the spaced-apart wall members 28 and 30.

While the core engine inlet 32 is in flow communication with the annular intake passageway 26, the collection chamber 24 is also in flow communication with passageway 26 and is located in a more nearly axial direction in respect to the passageway 26. However, the engine's compressor draws large volumes of air so a majority of airflow will enter the core engine inlet 32. Conversely, the collection chamber, by design, will not tend to draw in large volumes of engine inlet air.

While the collection chamber 24 will have low volumetric airflow, the quantity of extraneous matter is a different situation. Extraneous matter including sand, dust particles, and dirt will tend to have much greater density than the air within which it is entrained. Because these particles of extraneous matter have greater density, they will not be as affected by air pressure forces emanating from the core engine intake 32 and will therefore not be caused to change direction to the same degree as will the air molecules surrounding the extraneous matter. Therefore, the momentum of the extraneous matter particles will cause these particles to continue to move in a direction more nearby, like their original direction, and the particles will tend to progress axially downstream from the annular intake passageway 26 into an annular entrance 38 to the collection chamber 24 and thereafter downstream into the chamber itself. A series of black arrows have been drawn in FIG. 2 for the purpose of depicting a typical particle trajectory from the annular intake passageway 26 into the annular entrance 38 of the collection chamber 24.

As stated earlier, it is important that the extraneous matter directed into the collection chamber 24 be retained therein to prevent reingestion into the annular intake passageway 26. Typically, particle separators are provided with scroll vanes 40 for the purpose of retaining extraneous matter within the collection chamber 24. However, it has been found that previous forms of scroll vanes 40 have not been as effective as they might be for this purpose and have often caused extraneous matter to bounce off of upstream faces of the scroll vanes 40 and thereafter continue moving in an upstream direction back into the annular intake passageway 26 where they may be reingested into the airflow flowing into the core engine inlet 32. The black arrow depiction of the path of extraneous matter as shown in FIG. 2 illustrates such an effect caused by bouncing off the scroll vanes 40. It can be easily appreciated that such an effect will tend to subvert the purpose of the inlet particle separator 18, and it is desirable to prevent such reingestion from occurring.

Referring now to FIG. 3, an improved inlet particle separator employing scavenging means 34 comprising the present invention is shown in cross-section. As in most engines, outside air enters the engine through an engine intake 14 whereafter the air flows across intake vanes 42 into an annular intake passageway 26. As described in regard to previous separators, the engine hub 36 has a profile that rapidly increases in diameter to a maximum point in the annular intake passageway 26 and thereafter rapidly decreases in diameter in the direction of the core engine inlet 32. Again, as is the case with previous separators, the momentum of the extraneous matter entrained in the intake air tends to cause the particles to continue to flow in their original flow direction which tends to carry the extraneous matter into an annular entrance 38 to the collection chamber 24. Located within the annular entrance 38 are collector flowpath vanes 44 that are unique in construction and are specifically configured to reduce the percentage of extraneous matter reingested into the annular intake passageway 26. The collector flowpath vanes 44 extend radially between the inner and outer wall means 22 and 20 respectively. The collector flowpath vanes 44 function to physically direct extraneous matter into the collection chamber and retain extraneous matter therein to prevent regurgitation with subsequent ingestion into the core engine inlet 32.

Referring now to FIG. 4, a cross-section of the collector flowpath vanes 44 is shown to permit the reader to appreciate the unique construction of these vanes. The collector vanes 44 are shown in profile as viewed in a direction that is radial (perpendicular to the engine center line). The collector flowpath vanes 44 have upstream faces 46 that are sufficiently angled towards air flow stream direction in the annular entrance 38 for the purpose of preventing extraneous matter and particles from bouncing in an upstream direction off of the collector flowpath vanes 44. Continuing along the engine center line, the turning vanes 44 have a profile that begins at a vane leading edge 46 where the upstream faces 46 join together and progressively increases in cross-sectional width. The cross-sectional width is measured circumferentially in respect to engine center line and corresponds to a vertical direction in FIG. 4. This cross-sectional width continues to increase from the leading edge 46 to a maximum dimension generally indicated by an arrow designated as 48 as shown in FIG. 4.

While the collector vanes 44 are at maximum cross-sectional width at this location 48, in contrast, there are regions between the vanes 44 that are at a minimum cross-sectional flowpath area. These regions of minimum flowpath cross-sectional area between the vanes 44 are called vane throats 50. The vane throat regions 50 receive the extraneous matter bouncing off the vane upstream faces 46. As will be readily appreciated by those skilled in the art, the localized decrease in cross-sectional flowpath area at the vane throats 50 will cause an acceleration of the air flow stream as it flows through the vane throats.

Continuing along the engine center line downstream of the vane throats 50, the cross-sectional width of the turning vanes 44 no longer increases, but instead, decreases in dimension. At this location, the collector vanes 44 are provided with trailing edges 52 that are strongly angled in respect to engine axial direction and in respect to air flow stream direction. This region of the trailing edges receives the air and entrained extraneous matter that has been accelerated in the vane throats 50. The trailing edges 52 thereafter deflect this air and material into the collection chamber 24 (not shown in FIG. 4). The trailing edges 52 extend circumferentially beyond each adjoining vane throat region 50, when viewed along the engine center line. The trailing edges are extended this far in order to turn the contaminated air circumferentially and to block extraneous matter from bouncing back out of the collection chamber through the vane throat regions 50.

The purpose of this collector vane profile as described above is to generally cause extraneous matter that enters the annular entrance 38 to the collection chamber 24 to be directed at the vane throat regions 50. The air flow stream is locally accelerated along with the entrained matter in the vane throat regions which will in turn carry the particles downstream of the vane throats past the trailing edges 52 of the vanes 44. Thereafter, the extraneous matter will tend to remain trapped in the collection chamber 24 because the vane trailing edges 52 are strongly angled and will block particles from rebounding directly out of the collection chamber in an upstream direction.

The operation of the invention in an aircraft engine will now be described. Referring again to FIG. 3, it can be readily appreciated that particles entrained in engine intake air and directed into the collection chamber 24 will generally flow in an axial direction in respect to engine center line. Such particles as may strike the upstream faces 46 of the collector flowpath vanes 44 will rebound according to the laws of physics with an exit angle that is equivalent to the incident angle, absent any intervening forces. In addition, it must be remembered that frictional effects caused by the flow stream of air past the vanes 44 will tend to carry any rebounded particles in the same direction as the air flow stream.

Turning now to FIG. 4, in order to prevent any particles from rebounding off the upstream faces 46 in an upstream direction, it has been found that the included angle between adjoining upstream faces 46 of a single collector flowpath vane 44 should be in the range of 100 degrees or less. This included angle is indicated at 54 in FIG. 4. In addition, two adjoining half angles between adjacent upstream faces, one of which is indicated at 56, should generally have a common face that is in alignment with general flow stream direction which is usually close to parallel with engine center line. If the included angle is 100 degrees or less, any particles which rebound off the upstream faces 46 will tend to be directed towards the vane throats 50 or the general region of the vane throats 50. As these particles enter the regions 50 of the vane throats, they will be accelerated along with the local flow stream through the throats to the regions of the trailing edges 52. Once the particles have traveled past the vane throats 50, the particles will be impeded from rebounding upstream against the locally accelerated air flow.

Finally, the particles will be carried past the trailing edges 52 into a region of the collection chamber 24 where the collected particles can be harmlessly collected and/or dumped from the engine. It can now be appreciated that the upstream faces 46 of the collector flowpath turning vanes 44 have a "focusing" effect on any extraneous matter entrained in the local air stream. This focusing effect is effective for reducing the percentage of particles which are rebounded in an upstream direction thereby preventing regurgitation into the annular intake passageway 26. By focusing the particles the collector vanes direct the particles into the vane throats and downstream into the collection chamber.

While specific embodiments of the present invention have been described, it will be apparent to those skilled in the art that various modifications thereto can be made without departing from the scope of the invention as recited in the appending claims.

Having described the invention, what is claimed as novel and desired to be secured by Letters Patent of the United States is:

1. In a gas turbine engine having an annular intake passageway for receiving engine intake air, a compressor, a pair of spaced-apart wall members defining an annular compressor inlet in flow communication with the annular intake passageway and an inlet particle separator including wall means defining an annular collection chamber disposed radially outwardly of said pair of wall members defining said compressor inlet and being in flow communication with said annular intake passageway for receiving and removing extraneous matter from a stream of air supplied to the compressor inlet by way of said annular intake passageway and means for directing the extraneous matter out of the air stream within the annular intake passageway into the collection chamber; scavenging means for said inlet particle separator comprising:

a plurality of circumferentially spaced collector flowpath vanes located within an annular entrance of said collection chamber, wherein said collector flowpath vanes extend radially between said wall means defining said collection chamber and each vane has a leading edge and two oppositely extending substantially flat upstream faces extending radially between said wall means and joining together along said leading edge, and wherein said upstream faces of adjacent ones of said vanes are angled towards air flow stream direction in said annular entrance to define a converging channel therebetween effective for accelerating airflow therethrough, said flowpath vanes thereby being effective for substantially preventing bouncing of extraneous matter off of said collector flowpath vanes into said intake passageway.

2. The gas turbine engine recited in claim 1 wherein each of said upstream faces is angled at about 50 degrees in respect to an engine center line.

3. The gas turbine engine recited in claim 1 wherein adjacent ones of said collector flowpath vanes define a vane throat region therebetween having a minimum flowpath area, said vane throat regions being disposed at downstream-most ends of said upstream faces and being effective thereby for receiving extraneous matter bouncing off said upstream faces.

4. The gas turbine engine recited in claim 3 wherein said collector flowpath vanes further comprise trailing edges downstream of said vane throat regions, said trailing edges being angled in respect to an engine center line for turning airflow in a circumferential direction and away from said vane throat regions for the purpose of retaining extraneous matter in said collection chamber.

5. The gas turbine engine recited in claim 4 wherein said trailing edges extend circumferentially beyond adjacent vane throat regions.

6. The gas turbine engine recited in claim 1 wherein said two upstream faces joining together at said vane leading edge define an included angle therebetween of about 100 degrees.

7. The gas turbine engine recited in claim 1 wherein said collector flowpath vanes increase in width to a maximum dimension and therebetween form vane throat regions in said entrance of said collection chamber.

8. The gas turbine engine recited in claim 7 wherein said collector flowpath vanes additionally comprise trailing edges downtream of said vane throat regions, said trailing edges being angled in respect to engine center line for turning airflow in a circumferential direction and away from said vane throat regions for the purpose of retaining extraneous matter in said collection chamber.

9. In a gas turbine engine having an annular intake passageway for receiving engine intake air, a compressor, a pair of spaced-apart wall members defining an annular compressor inlet in flow communication with the annular intake passageway and an inlet particle separator including wall means defining an annular collection chamber disposed radially outwardly of said pair of wall members defining said compressor inlet and being in flow communication with said annular intake passageway for receiving and removing extraneous matter from a stream of air supplied to the compressor inlet by way of said annular intake passageway with means for directing the extraneous matter out of the air stream within the annular intake passageway into the collection chamber; said inlet particle separator having scavenging means comprising:

a plurality of radially extending collector flowpath vanes spaced circumferentially within an annular entrance of said collection chamber;

each of said collector flowpath vanes having a leading edge and two oppositely extending substantially flat upstream faces, said upstream faces of adjacent ones of said vanes being angled towards air flow stream direction within said annular entrance to said collection chamber to define a converging channel therebetween effective for accelerating airflow therethrough, said vanes thereby being effective for a purpose of focusing extraneous matter;

adjacent ones of said vanes defining vane throat regions therebetween having a minimum flow area, said throat regions disposed at downstream-most ends of said upstream faces and being effective for receiving said extraneous matter; and said collector flowpath vanes having trailing edges downstream of said vane throat regions, said trailing edges being angled in respect to an engine center line for turning airflow in a circumferential direction and away from said throat regions for guiding extraneous matter into said collection chamber and preventing said extraneous matter from rebounding out of said collection chamber.

10. The gas turbine engine recited in claim 9 wherein each of said upstream faces of said collector flowpath vanes is angled at about 50 degrees of said engine center line.

11. For a gas turbine engine having an inlet particle separator with collector vanes spaced circumferentially within an entrance of an annular collection chamber of said inlet particle separator, said collector vanes comprising:

a leading edge and two oppositely extending substantially flat upstream faces joined together at said leading edge, and a trailing edge extending from both said upstream faces and being generally parallel to one of said upstream faces and generally normal to the other of said upstream faces.

12. In a gas turbine engine having an inlet particle separator system comprising:

an annular hub member and an annular outer wall spaced radially outwardly therefrom for defining an intake passageway;

an annular splitter member disposed in a downstream end of said intake passageway, said splitter member having a first wall spaced radially inwardly from said outer wall for defining therebetween an annular collection chamber having an annular entrance in flow communication with said intake passageway for receiving relatively contaminated air therefrom, said splitter member having a second wall spaced radially outwardly of a downstream portion of said hub member for defining therebetween a core engine inlet in flow communication with said intake passageway for receiving relatively clean air therefrom; and a plurality of circumferentially spaced collector vanes extending between said outer wall and said first wall in said entrance to said collection chamber and being effective for turning and channeling airflow and any included extraneous matter therein in a circumferential direction and into said collection chamber; the improvement comprising:

each of said collector vanes having a leading edge and two oppositely extending substantially flat upstream faces joined along said leading edge, upstream faces of adjacent ones of said vanes defining a converging channel therebetween having a throat region of minimum area and being effective for accelerating airflow therethrough, each of said vanes including a trailing edge extending from said two upstream faces in a circumferential direction;

said collector vanes being thereby effective for focusing airflow through said converging channels and throat regions for reducing rebound of particles from said vanes and into said core engine inlet.

13. An improved inlet particle separator system according to claim 12 wherein said upstream faces of said collector vanes define an included angle therebetween of about 100 degrees.

* * * * *